United States Patent [19]

DeTar, Jr. et al.

[11] 4,347,567
[45] Aug. 31, 1982

[54] COMPUTER SYSTEM APPARATUS FOR IMPROVING ACCESS TO MEMORY BY DEFERRING WRITE OPERATIONS

[75] Inventors: George F. DeTar, Jr., Westminster, Colo.; Marcus J. Schaefer, Plano; William R. Busby, Richardson, both of Tex.

[73] Assignee: Rockwell International Corporation, El Segundo, Calif.

[21] Appl. No.: 118,940

[22] Filed: Feb. 6, 1980

[51] Int. Cl.³ .............................................. G06F 5/06
[52] U.S. Cl. ................................. 364/200; 364/900
[58] Field of Search ... 364/200 MS File, 900 MS File

[56] References Cited

U.S. PATENT DOCUMENTS

| | | | |
|---|---|---|---|
| 3,432,813 | 3/1969 | Annunziata et al. | 364/200 |
| 3,488,633 | 1/1970 | King | 364/200 |
| 3,573,744 | 4/1971 | Rigazio | 364/200 |
| 3,626,376 | 12/1971 | Anderson et al. | 364/200 |

OTHER PUBLICATIONS

IBM Technical Disclosure Bulletin, vol. 20, No. 9, Feb. 1978, p. 3603, C. D. Holtz and K. J. Parchinski, "Mark Bit Generator".

*Primary Examiner*—Gareth D. Shaw
*Assistant Examiner*—Terence Flyntz
*Attorney, Agent, or Firm*—V. Lawrence Sewell; Howard R. Greenberg; H. Fredrick Hamann

[57] ABSTRACT

An improvement is disclosed for a computer system wherein a high speed peripheral device sends data words of a first length to a memory which operates with a word of a greater length, for example, twice the data word length. The improvement includes an apparatus for identifying pairs of data words which belong together in a single memory word. Then, a pair of the data words can be written to memory in a single operation, rather than two separate write operations.

8 Claims, 6 Drawing Figures

MAAR = MISS ACCESS ADDRESS REGISTER
DHR = DATA HOLDING REGISTER 4,347,567

COMPUTER SYSTEM APPARATUS FOR IMPROVING ACCESS TO MEMORY BY DEFERRING WRITE OPERATIONS

BACKGROUND OF THE INVENTION

The present invention relates to computer systems and more particularly to an apparatus for improving memory access times of a high speed peripheral device making accesses to memory.

It can be advantageous in the present state of the art for a computer system which uses, for example, a 16-bit data word to employ memory modules which operate with a 32-bit word. To most effectively use the capacity of such a memory, one 16-bit data word is stored in a first half of a 32-bit memory word, while a second data word is stored in the second half of the memory word. In order to perform a write of one data word to memory, the present contents of the relevant 32-bit memory word are first fetched from the memory storage elements. Then in registers, half the memory word is replaced with the data word to be written. Finally, the modified thirty-two bits are stored in the memory elements.

It has been conceived in accordance with the present invention that certain circumstances permit a considerable improvement in access times to a doubleword memory. In particular, where a high speed peripheral device such as a magnetic disc writes a series of words to sequential addresses in memory, it would be advantageous if each pair of 16-bit data words destined for a 32-bit memory word could be stored there in one write operation rather than two.

SUMMARY OF THE INVENTION

The invention comprises an apparatus interposed between a high speed peripheral device and memory. The apparatus includes means for holding a first data word and address received from the peripheral device and intended to be written to memory. The apparatus then waits for the arrival of a second address and data word which are to be written to memory and then determines whether the two addresses are in a single memory word. If they are, the apparatus writes the first and second data words to the memory in a single doubleword operation. If the two addresses are not in the same memory word, then the apparatus writes the first data word to memory and holds the second data word and address for possible writing to memory along with a third data word and address yet to be received from the peripheral device.

In a series of data words to be written to sequential addresses in memory from the peripheral device, most of the words can be written in pairs rather than one at a time. This automatically cuts the memory access time approximately in half. In addition, in some systems a 32-bit write does not require the auxiliary read operation which is necessary for a 16-bit write. In those systems, each of the write operations can be somewhat faster than for a 16-bit write.

DESCRIPTION OF A PREFERRED EMBODIMENT

Figure 1:
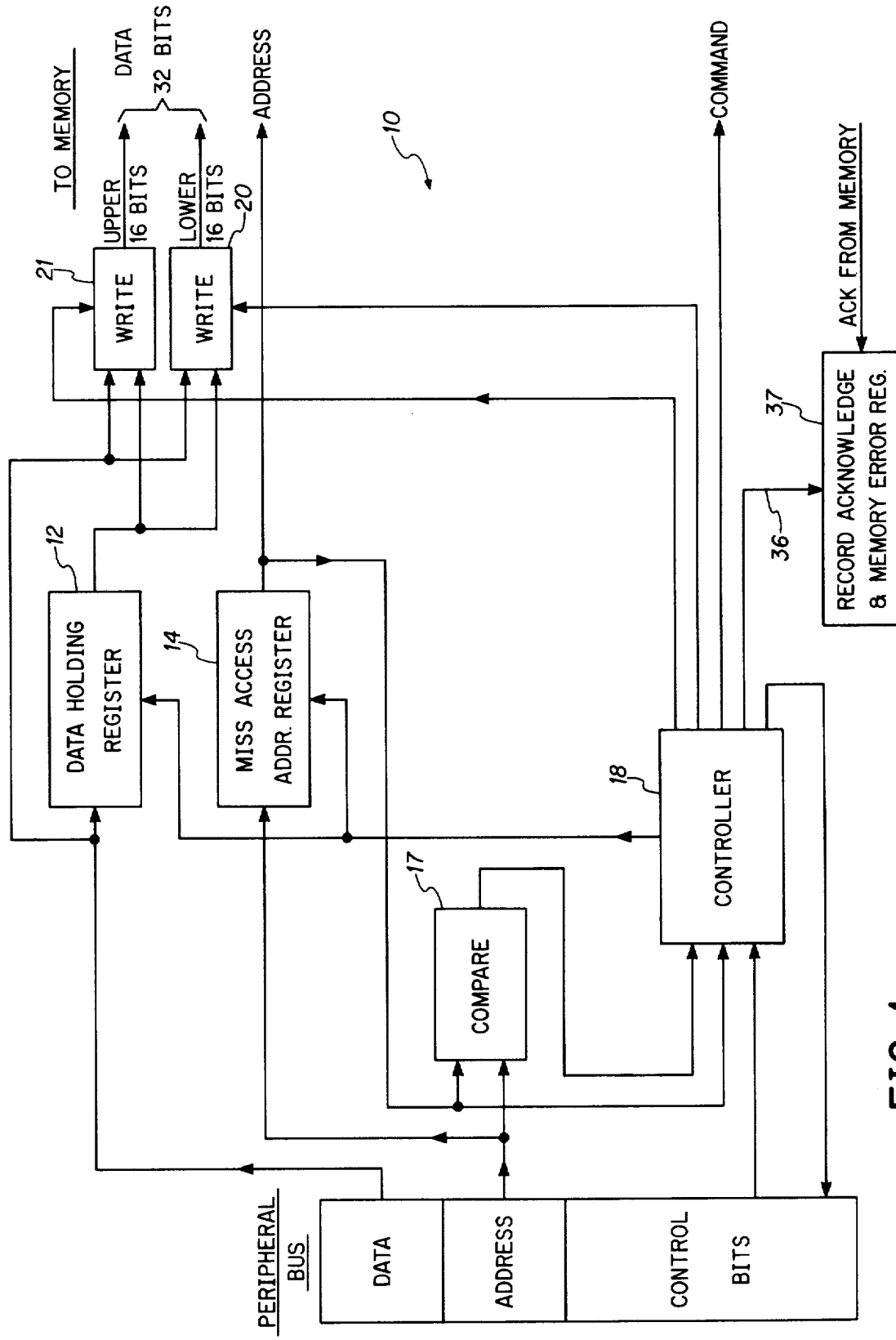
FIG. 1 is a block diagram of a computer system apparatus in accordance with the invention.

FIG. 1 shows a block diagram of an apparatus according to the invention, indicated generally by the reference numeral 10. At the left of the diagram is a peripheral bus bringing communications from a high speed peripheral device such as a magnetic disc, while at the right of the figure are communications to and from memory. The peripheral bus presents to the apparatus 10 data to be written, a memory address to which the data is to be written, and various control bits.

By way of example, it will be assumed herein that the apparatus 10 is writing 16-bit words to a memory which uses 32-bit words. The memory address which apparatus 10 receives from the peripheral bus includes as the major portion the address of the relevant 32-bit memory word. In addition, the address includes two low order bits, one specifying which half of the memory word a 16-bit word is to be stored in, and the other bit specifying a byte location within the 16-bit word.

In writing sixteen bits, first, the 32-bit memory word which is to contain the sixteen bits is read from memory. Then one-half of the memory word is changed in accordance with the sixteen bits to be written, and the thirty-two bits as modified are written back into the appropriate memory word.

It often happens in the transfer of data from a high speed peripheral device to memory that a first 16-bit word will be written to the first half of a 32-bit memory word and then the next write requested will be for a 16-bit word to the other half of the 32-bit memory word. If the two side-by-side 16-bit words could be written to memory as one 32-bit word, a substantial savings in time would result, since it takes no longer to write a 32-bit doubleword to memory than each 16-bit single word. In fact, in writing thirty-two bits, it is not necessary to perform the read which is necessary for a 16-bit write. It is the function of apparatus 10 to recognize when two 16-bit words can be written in one operation into one 32-bit memory word.

When a series of 16-bit data words are to be written to memory, the first word to arrive at apparatus 10 on the peripheral bus is stored in a data holding register 12. The memory address at which the data in register 12 is to be stored is entered in miss access address register 14. Then, when the second data word to be written arrives, it is compared by compare circuit 17 with the previously received address stored in miss access address register 14. If, for example, the address received from the peripheral bus is an 18-bit address, including word and byte bits, then compare circuit 17 can be four-bit comparators which together can check the sixteen higher order bits of the bus address against the sixteen higher order bits in register 14.

A controller 18 receives the output of compare circuit 17, along with other information to determine whether the address just received from the bus is in the same 32-bit memory word as the word address in miss access address register 14. If it is, then controller 18 commands write multiplexers 20 and 21 to write a 32-bit doubleword comprised of the word in register 12 and the bus data word to the 32-bit memory word addressed in miss access register 14 and on the bus.

Multiplexer 20 writes 16 data bits to the lower half of the 32-bit memory word, and multiplexer 21 writes to the upper half (the one with the higher address). Therefore, if the address on the bus is the same as that in the miss access address register 14, and the addresses being received from the peripheral device are a sequence of increasing addresses in memory, then the data on the peripheral bus will be for the upper half of the memory word. In this situation multiplexer 21 will output data from the peripheral bus, and multiplexer 20 will output data from the data holding register 12. If the addresses are a sequence of decreasing addresses in in memory, then multiplexer 21 will output from the data holding register, and multiplexer 20 will output from the peripheral bus.

If the write address just received from the peripheral bus does not share the same 32-bit memory word as the address in miss access register 14, then controller 18 causes write multiplexers 20 and 21 to do a 16-bit write to memory of the data word in data holding register 12. On the basis of the address in register 14, the memory unit is informed which half of the 32-bit memory word is to be written into. The data and address just received on the peripheral bus are then transferred into data holding register 12 and miss access address register 14, respectively.

Figure 2:
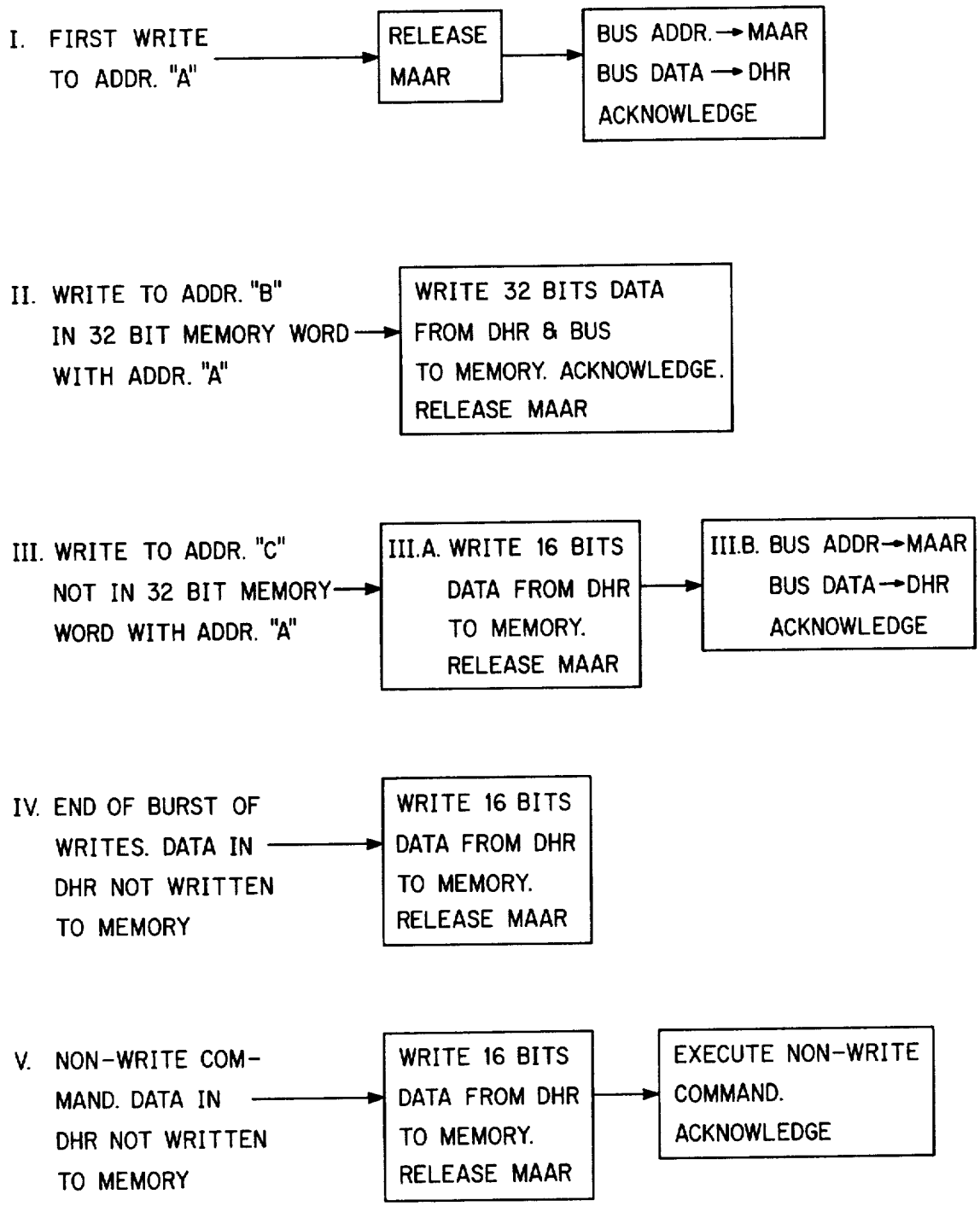
FIG. 2 is a chart illustrating various alternative operations performed in the apparatus of FIG. 1.

FIG. 2 illustrates in more detail the operation of apparatus 10 under five different circumstances. Case I, is the situation in which the first of a group of write commands reaches the apparatus 10. The apparatus first releases the miss access address register, that is, enables its contents to be written over. Next, the bus address "A" is written into the miss access register 12. Then it is important that apparatus 10 sends a signal onto the peripheral bus which constitutes an acknowledgment to the peripheral device that sent the data word to be written to memory. Apparatus 10 acknowledges to the peripheral device that the data word has been written to memory, though in fact it is being held in data holding register 12, as described above. This puts the peripheral device in a condition to send a second word to be written to memory.

In Case II, a second data word to be written to memory arrives at apparatus 10 and is found to have an address "B" which puts it in the same 32-bit memory word as the immediately preceding write address. Then, as described above in connection with FIG. 1, the apparatus writes a 32-bit doubleword of data from the data holding register 12 and the bus to the 32-bit memory word address held in miss access register 14. Again, it acknowledges to the peripheral bus that the write to memory has been performed. In this case, the write has actually been executed. The miss access register is released, since the address there is no longer needed.

In Case III, after receiving a write to a first address A, apparatus 10 receives a write to a second address "C" which is not in the same 32-bit memory word with the first address A. In this case, two main functions are performed, designated in FIG. 2 as IIIA and IIIB. In function IIIA, apparatus 10 having recognized that the two words in holding register 12 and the bus are from different 32-bit memory words, writes the word in data holding register 12 to the memory address A in miss access register 14. The miss access register 14 is released in preparation for the next part of the operation. Then in IIIB, the apparatus transfers the data from the bus into data holding register 12, and the bus address C to miss access register 14. In addition, apparatus 10 acknowledges to the peripheral device that the data entered into the holding register 12 has been written to memory. If the next received write address is to an address D which is in the same 32-bit memory word with address C, then the operation of Case II is carried out.

If at the end of a burst of write operations there is a data word in holding register 12 which has not been written to memory, then Case IV applies. In this case, the apparatus 10 simply writes the data in the holding register to memory. In this case, an acknowledgment would have already been sent out at the time the data was entered in the holding register. The miss access register is released so that it may be used by operations other than writes.

In Case V, a command other than a write, such as a read, is received while a write is being held in the data holding and miss access registers 12 and 14. First apparatus 10 performs the deferred write and releases the miss access register. Then the nonwrite command may be executed and acknowledged to the peripheral device.

Figure 3:
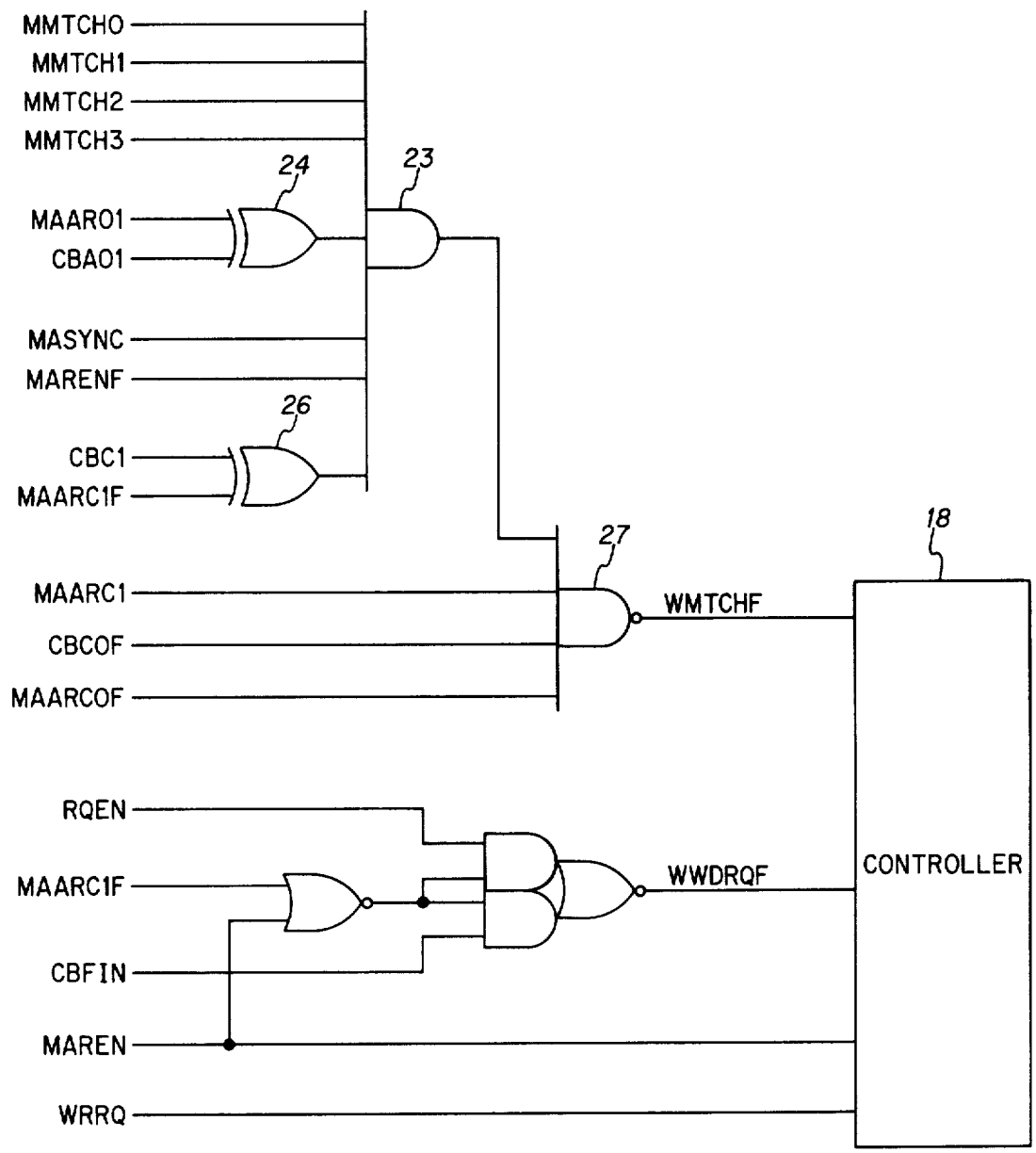
FIG. 3 is a logic diagram of inputs to a controller of the system of FIG. 1.

FIG. 3 shows in more detail the nature of the logical inputs to controller 18. In this figure and throughout the present application, the convention will be used in which the addition of the letter "F" to the end of the name of a variable indicates the logical inverse of that variable. Inputs MMTCH0-MMTCH3 to AND gate 23 are the outputs of compare circuit 17. If, for example, MMTCH0 is 1, it indicates that each of a particular four bits of the bus address matches with a corresponding one of the bits of the address in the miss access register 14. The comparator outputs compare all of the address bits, except the word and byte address bits. That is, the comparator compares addresses of 32-bit memory words. Therefore, if all of MMTCH0-MMTCH3 are 1, it indicates that the bus address and the miss access register address are both accessing the same 32-bit memory word.

An Exclusive OR gate 24 receives as inputs MAARO1 and CBAO1, which are the number 1 bit of the miss access address and of the bus address, respectively. If the output of gate 24 is a 1, it means that the bus address and miss access register address are in different halves of the 32-bit memory words where they are located. When the input MASYNC to AND gate 23 is 1, it indicates that a command is being transmitted to apparatus 10 on the bus. When the variable MARENF is 1, it indicates that the miss access address register is not enabled for being written into, because an address is being saved there. Exclusive OR gate 26 receives as an input CBC1, which is a command control bit from the bus. The other input to gate 26 is MAARC1F which is the same control bit as CBC1, except it is stored in a register (not shown) as a part of the command held in miss access register 14 and data holding register 12. When the output of Exclusive OR gate 26 is a 1, it indicates that both the bus command and the stored command are the same, both a write or both a read.

The output of AND gate 23 is an input to NAND gate 27 along with several other inputs including MAARC1. When MAARC1 is a 1, then the deferred or stored command is a write. If the other two inputs to gate 27, CBC0F and MAARC0F are both 1, this indicates that neither the stored nor the bus command is a byte write operation.

In summary, the output WMTCHF of gate 27 is 0 and active, under the conditions of Case II of FIG. 2, when the data from the bus and data holding register 12 are to be written as one 32-bit word to memory.

For the variable WWDRQF in FIG. 3 to become active and 0 (so that WWDRQ is 1), then MAARC1F must be 0 indicating that the stored or deferred command is a write, and the miss access register enable variable MAREN must be 0, indicating that an address is being saved there. If RQEN is 1, indicating that a new command has been received from the bus, then WWDRQF indicates the need to write the sixteen bits of data from the data holding register to memory. WWDRQF can be activated although RQEN does not indicate a bus request, if CBFIN is 1, indicating that the peripheral device has stopped sending commands to apparatus 10. This is Case IV of FIG. 2, and the data holding register must be cleared out by a write to memory.

Other inputs to controller 18 are MAREN, which when 1 indicates that an address is being saved in miss access register 14. In addition, there is the input variable WRRQ which indicates the initiation of a new write command from the bus or a read command from the bus with a deferred write stored in miss access and holding registers 14 and 12.

Figure 4:
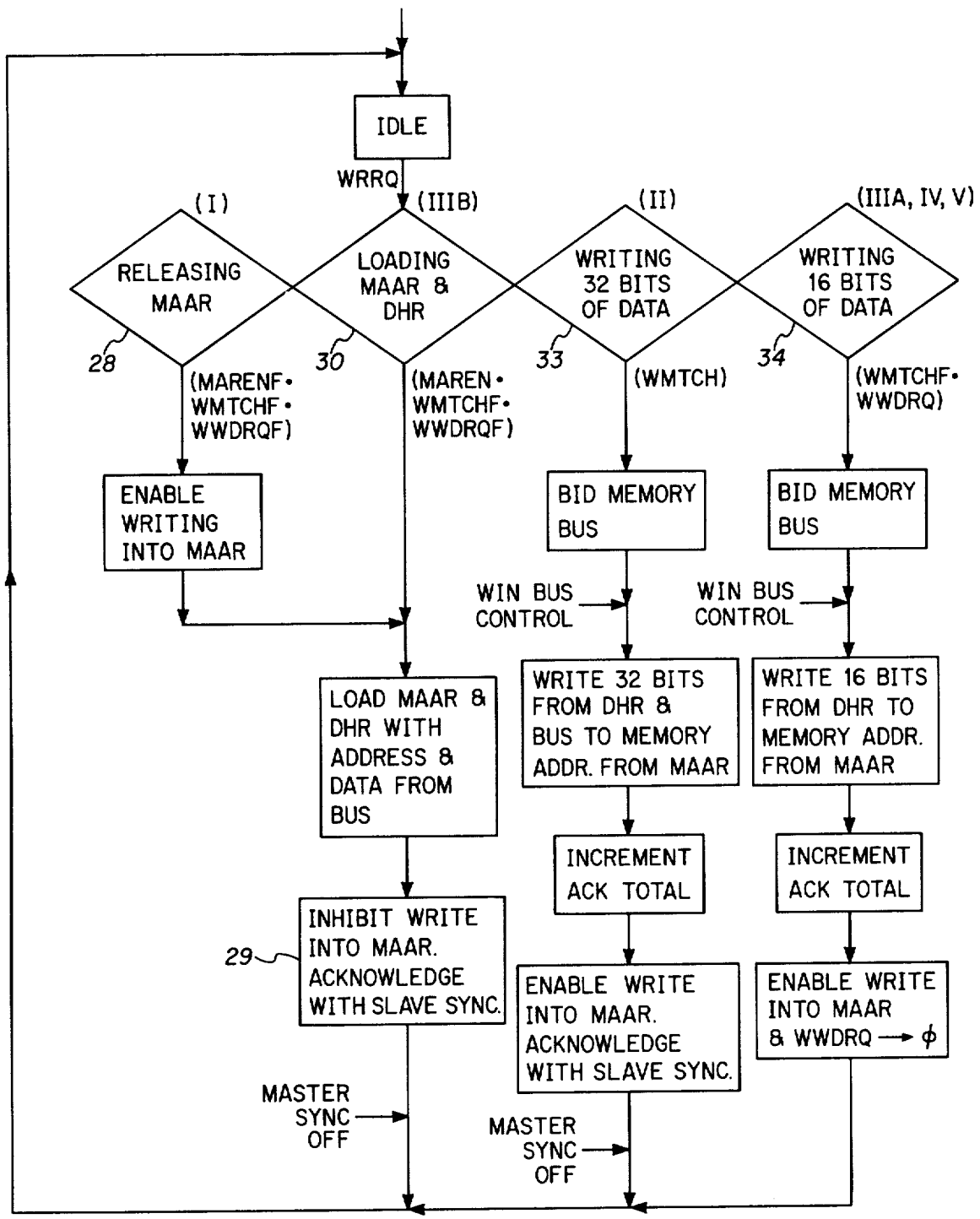
FIG. 4 is a flow chart of the operation of the controller of FIG. 1.

FIG. 4 illustrates the operation of controller 18. The controller is switched out of an idle state by the activation of variable WRRQ. The particular control path taken by controller 18 depends on the states of its input variables. One path, indicated by the reference numeral 28 executes functions corresponding to Case I of FIG. 2, as indicated beside the decision block at the beginning of the control path in FIG. 4.

The logical equation of variables following the decision block at the beginning of path 28 indicates the condition which causes controller 18 to pursue this path. When WWDRQ is false, the contents of the miss access register 14 and data holding register 12 are not to be used for writing to memory. When MAREN is 0, then the miss access register is not enabled for writing to it. Accordingly, the first step of path 28 is to enable writing into the miss access register. Next this register is loaded with the address from the bus, and the data from the bus is put in the data holding register 12. Then writing into the miss access register is inhibited to save its contents.

Figure 5:
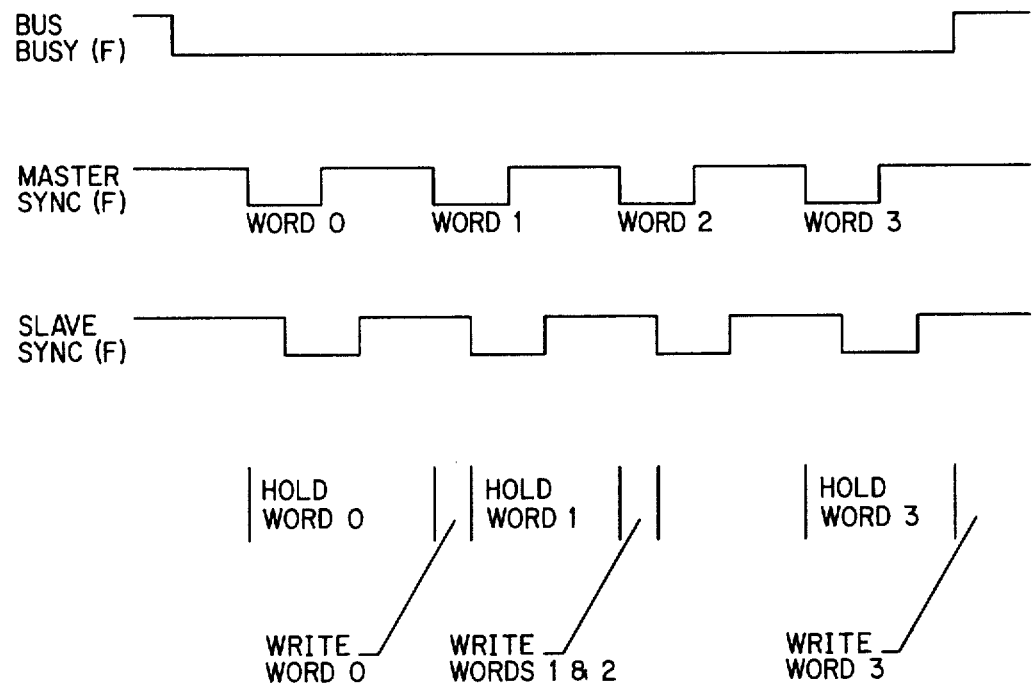
FIG. 5 is a collection of waveforms illustrating aspects of the operation of the system of FIG. 1.

At the end of path 28, apparatus 10 sends a slave sync signal onto the peripheral bus to indicate that it has completed processing the command received on the bus from the peripheral device. This process is illustrated in FIG. 5. In the uppermost waveform of FIG. 5, a bus busy signal goes active false, indicating that a peripheral device has control of the peripheral bus. In the next trace, a master sync signal becomes active false as the peripheral device sends a command on the bus. In the example shown, the particular command is to write a word to memory, and the first word sent is designated word 0. In the bottom trace of FIG. 5, the slave sync signal is set active false by apparatus 10, as in state 29 of the controller path 28, signifying that apparatus 10 has completed processing the command from the peripheral device. As seen in FIG. 5, the master sync signal is set at 1, inactive when the peripheral device receives the active slave sync signal. As shown in FIG. 4, the receipt of the master sync signal by apparatus 10 causes controller 18 to leave state 29 and return to the idle state.

Controller 18 enters state 30 under conditions similar to that for entering state 28, except not requiring the enabling or release of the miss access register. This is the case IIIB of FIG. 2. Having bypassed the release of the miss access register, path 30 proceeds the same as path 28.

The controller path which performs the first function of Case III is path 34. This path also performs operations required in cases IV and and V. In this case, WWDRQ indicates that the data stored in data holding register 12 must be written to memory. Variable WMTCH is 0, indicating that the address on the bus and that in miss access register 14 are not parts of the same 32-bit memory word, so only sixteen bits are to be written to memory, not thirty-two.

In the first state of path 34, apparatus 10 bids for control of a bus to memory. Once it wins bus control, it writes sixteen bits from the data holding register to the memory address which is stored in the miss access register. Then it increments an acknowledge total as indicated generally by the input 36 in FIG. 1 and described in more detail in connection with FIG. 6. This is a function which keeps an account of the number of writes sent to memory and the number of acknowledgments of completed writes received from memory by apparatus 10.

In the final state of path 34, writing is enabled into the miss access register, since the contents have now been used. Further, the variable WWDRQ is set to 0. The controller then loops back through the idle condition and branches to path 30 to complete its processing for Case III. It is not necessary in path 30 to enable the miss access register, since this was just done at the end of loop 34.

The controller 18 goes through control path 33 when WMTCH is 1, indicating the conditions in Case II of FIG. 2. After gaining control of the bus to memory, the controller causes write multiplexers 20 and 21 to write a 32-bit data word from the peripheral bus and the data holding register to memory. Then the acknowledge total is incremented. The miss access address register is enabled to receive a new address for the next write command received from the peripheral bus. Finally, apparatus 10 puts a slave sync signal onto the peripheral bus acknowledging to the peripheral device which sent the write commands that the write operations have been completed. When the master sync signal is turned off by the peripheral device, controller 18 leaves the last state of path 33 and returns to the idle condition.

FIG. 5 illustrates an example of the operation of apparatus 10, in a case where four write commands for data words numbered 0–3 are received from a peripheral device in a burst. In the example, it is assumed that words 1 and 2 are to be written to the two halves of a 32-bit memory word.

Initially, word 0 is held in data holding register 12. Then, when the write command with word 1 is received, word 0 is written to memory and word 1 is entered into the data holding register, upon the receipt of a command for writing word 2, the saved word 1 is written along with word 2 in a 32-bit word to memory.

When word 3 arrives, it is held in the data holding register in anticipation of the arrival of more write commands. However, instead, the bus busy signal is turned off, indicating the end of transmission of commands from the peripheral device. At that point, apparatus 10 proceeds to write word 3 to memory from the data holding register.

Figure 6:
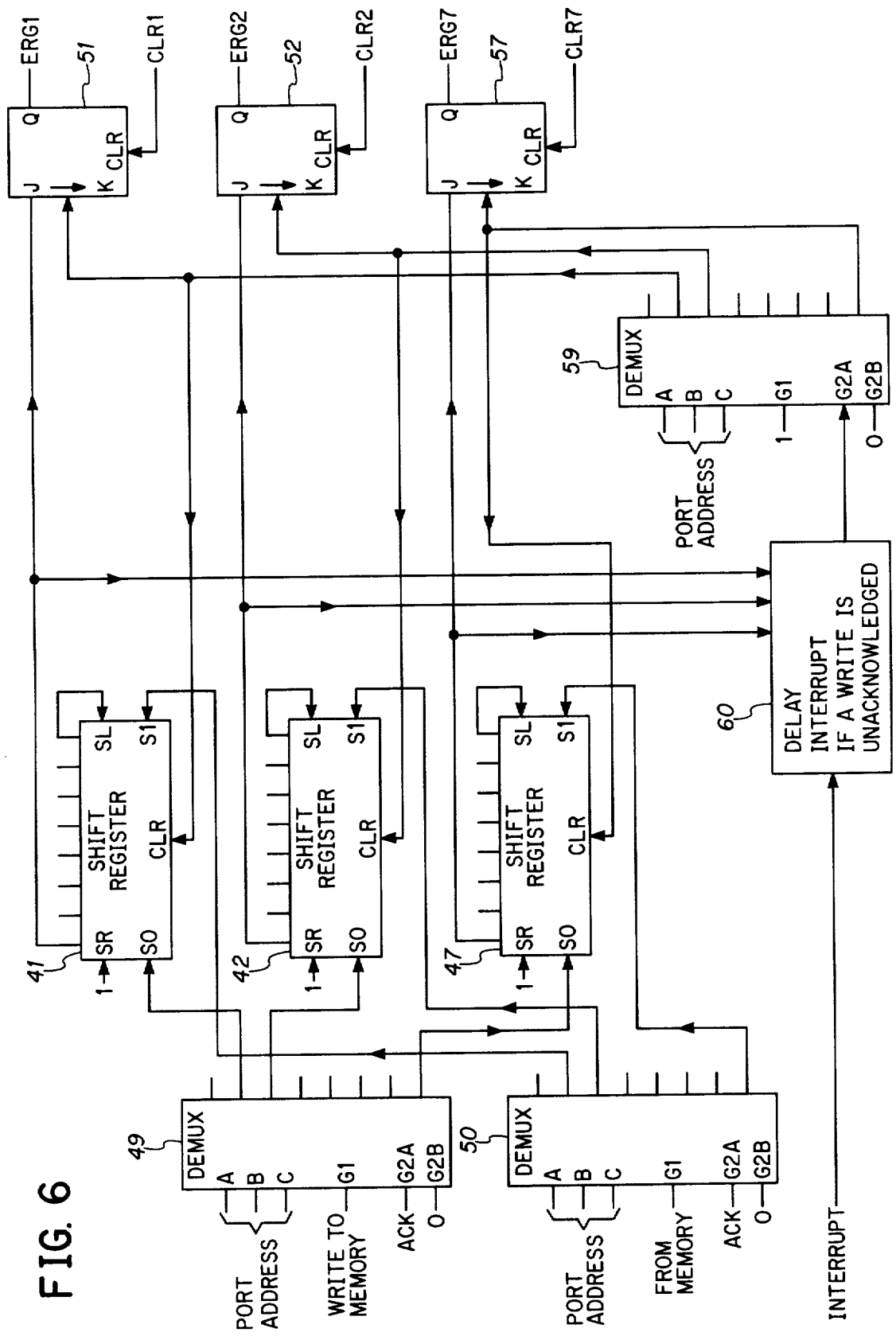
FIG. 6 is a logic diagram of an acknowledgment recording circuit in the apparatus of FIG. 1.

FIG. 6 illustrates in detail the system for recording acknowledge signals from memory, indicated generally in FIG. 1 by reference numeral 37. The advantage of such a system is that in Cases I and III, apparatus 10 acknowledges to the peripheral device that a successful write to memory has occurred, when in fact no write has even been attempted. Instead, the data and address have been stored in registers 12 and 14 respectively, deferring the write operation until somewhat later. If there then occurs an error in the deferred attempt by apparatus 10 to write the data to memory, the peripheral device sending the write commands would not find out about it.

The devices in FIG. 6 which keep the acknowledge count for apparatus 10 are shift registers 41, 42 and 47. Preferably, there is one shift register for each port or peripheral device on the peripheral bus. For purposes of illustration, three shift registers are shown. Associated with each shift register is one of the flip-flops 51, 52 and 57. When a peripheral device completes a burst of writes, it triggers a completion interrupt, signalling a service program in a control processor to examine the appropriate one of flip-flops 51, 52 and 57. In this way, the control processor checks if all attempted writes have been completed.

Whenever a write to memory is performed, a demultiplexer 49 sends a signal to that shift register corresponding to the peripheral device which sent the data to apparatus 10. This signal, applied to input S0 of the shift register, shifts the contents of the register right and enters a 1 into the leftmost bit. When an acknowledgment of a completed write is received from memory, demultiplexer 50 sends a signal to input S1 of the appropriate shift register to shift the contents thereof left and reenter the contents of the rightmost bit in itself. A shift register is cleared upon the occurrence of the write completion interrupt, so that all bits are initially 0 for any new transfer begun by the peripheral.

In the error free case, apparatus 10 should be waiting for not more than two or three acknowledgements which have yet to be received from memory. In this case, there will only be two or three of the leftmost bits of the relevant shift register which are occupied by 1's. Then at the end of a burst of writes, and after all acknowledgments have come back to apparatus 10 from memory, all the 1's will be shifted out of the relevant register to the left and the leftmost bit of the register will be a 0.

If one or more of the writes to memory from apparatus 10 are not acknowledged by memory at the end of a reasonable time after the conclusion of a burst of writing by a peripheral device, then there will be a corresponding number of 1's in the appropriate shift register. This condition will be detected in the leftmost bit and used to set the associated one of the flip-flops 51, 52 and 57. When the peripheral device finishes its burst of write operations, it sends the completion interrupt which is routed by demultiplexer 59 to the appropriate one of the flip-flops 51, 52 and 57. As indicated by block 60 in FIG. 6, if there is a write to memory which has not yet been acknowledged when the interrupt is received, then the application of the interrupt to demultiplexer 59 is delayed for a reasonable time to allow properly functioning memory operations to complete and send back acknowledgments. When demultiplexer 59 does clock the leftmost bit of a shift register into its corresponding flip-flop, the shift register contents are also cleared to 0 in preparation for another burst of writes.

The outputs ERG1, ERG2 and ERG7 of the flip-flops 51, 52 and 57 form the memory error register. These bits are capable of interrogation by a software routine to check whether a port has experienced any memory errors. After the interrogation, the software routine can issue a signal to the appropriate one of the clear inputs CLR1, CLR2 or CLR7 to set the interrogated flip-flop to 0.

Through the combination of means described above, the apparatus of the invention is able to achieve an overall operation in which it groups two 16-bit data words together and writes them to a 32-bit word memory in one operation instead of two. This is of significant utility, since it is very common for high speed peripheral devices such as a magnetic disc to write a long series of data words to sequential addresses in memory. It will be apparent that there is a considerable advantage, if most of this data can be written to memory two words at a time, rather than one word at a time.

We claim:

1. In a computer system, wherein a device on a bus can gain control of the bus and send a write command including an address and a data word of a first number of bits on the bus to be written to a memory which operates with a word of at least twice said first number of bits, the improvement comprising:
   means for receiving from said bus a first write command including a first address and data word to be written to said memory;
   means for storing said first data word and address;
   means for receiving a second write command including a second address and data word to be written to the memory;
   means for comparing said received second address with said stored first address and making a determination whether said first and second addresses lie within a single one of said memory words; and
   means, responsive to the determination that said first and second addresses lie in said one memory word, for performing a single write of said first and second data words to said one memory word.

2. The computer system of claim 1, wherein said means for storing said first data word and address further includes means for acknowledging to said device as though said first data word were written to said memory.

3. The system of claim 2, further including means for accounting for the number of said writes performed, as compared with write acknowledgments received from said memory.

4. The system of claim 3, wherein said means for accounting includes a shift register wherein shifts in one direction represent said writes performed and shifts in the opposite direction represent said write acknowledgments received from memory.

5. The computer system of claim 1, further including means responsive to the determination that said first and said second addresses do not lie within a single one of said memory words, for writing said first data word to memory and storing said second data word and address.

6. The computer system of claim 1, wherein said device can give an indication to said improvement through the bus that, after sending said first data word and address, the device is relinquishing said control of the bus, said improvement further including:

means responsive to said indication for writing said first data word to memory without waiting for any said second write command.

7. The computer system of claim 1, wherein said device can send to said improvement through the bus, commands other than said write commands, said improvement further including:
   means for receiving one of said other commands and, in response thereto, writing to memory said first data word without waiting for any said second write command.

8. The improvement of claim 1, wherein said means for performing a single write is additionally responsive to an indication that said first and second data words are both parts of write commands and wherein said improvement further includes:
   means for storing a representation that said first data word which is to be written to memory is part of a write command;
   means for receiving a representation that said second data word which is to be written to memory is part of a write command; and
   means responsive to said representations for providing, to said means for performing a single write, said indication that said first and second data words are both parts of write commands.

* * * * *